(12) United States Patent
Kimura et al.

(10) Patent No.: US 11,312,091 B2
(45) Date of Patent: Apr. 26, 2022

(54) MOLDING APPARATUS AND MANUFACTURING METHOD

(71) Applicant: GH CRAFT LTD., Shizuoka (JP)

(72) Inventors: Gaku Kimura, Shizuoka (JP); Takeshi Sukemune, Shizuoka (JP); Akinori Okubo, Shizuoka (JP); Yosuke Aragane, Shizuoka (JP)

(73) Assignee: GH Craft Ltd., Shizuoka (JP)

( * ) Notice: Subject to any disclaimer, the term of this patent is extended or adjusted under 35 U.S.C. 154(b) by 307 days.

(21) Appl. No.: 15/580,566

(22) PCT Filed: Jun. 14, 2016

(86) PCT No.: PCT/JP2016/067667
§ 371 (c)(1),
(2) Date: Dec. 7, 2017

(87) PCT Pub. No.: WO2016/204144
PCT Pub. Date: Dec. 22, 2016

(65) Prior Publication Data
US 2018/0186106 A1    Jul. 5, 2018

(30) Foreign Application Priority Data

Jun. 16, 2015 (JP) .............................. JP2015-121407

(51) Int. Cl.
*B29C 70/56* (2006.01)
*B29C 70/50* (2006.01)
(Continued)

(52) U.S. Cl.
CPC .............. *B29C 70/56* (2013.01); *B29C 31/08* (2013.01); *B29C 31/10* (2013.01); *B29C 35/02* (2013.01);
(Continued)

(58) Field of Classification Search
CPC ...... B29C 70/506; B29C 70/508; B29C 70/56
See application file for complete search history.

(56) References Cited

U.S. PATENT DOCUMENTS

| 3,689,343 A | 9/1972 | Elsner |
| 5,006,294 A * | 4/1991 | Bice ....................... B29B 15/08 |
| | | 156/180 |

(Continued)

FOREIGN PATENT DOCUMENTS

| CN | 101462358 A | 6/2009 |
| EP | 25 40 480 A1 | 1/2013 |

(Continued)

OTHER PUBLICATIONS

Translation of Search Report dated Jan. 29, 2019, in connection with European Patent Application No. 16811618.4.

(Continued)

*Primary Examiner* — Francisco W Tschen
*Assistant Examiner* — Adrianna N Konves

(57) ABSTRACT

A molding apparatus reduces waviness or deformation of fibers. The molding apparatus includes a fiber feeder that feeds fibers, a resin feeder that feeds a resin, a curing accelerator that accelerates curing of the fed resin while the fed fibers are being tensioned, and a transporter that relatively changes a feeding position of the fibers, a feeding position of the resin, and an accelerating position of the curing.

16 Claims, 15 Drawing Sheets

(51) Int. Cl.
  *B29C 70/38* (2006.01)
  *B29C 31/08* (2006.01)
  *B29C 31/10* (2006.01)
  *B29C 35/02* (2006.01)
  *B29C 70/42* (2006.01)
  *B29C 70/54* (2006.01)

(52) U.S. Cl.
  CPC ............ *B29C 70/386* (2013.01); *B29C 70/42* (2013.01); *B29C 70/506* (2013.01); *B29C 70/546* (2013.01)

(56) References Cited

U.S. PATENT DOCUMENTS

| | | | |
|---|---|---|---|
| 5,344,602 A * | 9/1994 | Yencho | B29C 53/04 156/222 |
| 8,336,596 B2 | 12/2012 | Nelson et al. | |
| 8,580,060 B2 | 11/2013 | Bech | |
| 10,016,947 B2 | 7/2018 | Matsen et al. | |
| 2009/0151865 A1 | 6/2009 | Martinez et al. | |
| 2009/0211698 A1 | 8/2009 | McCown | |
| 2011/0000608 A1 | 1/2011 | Bech | |
| 2011/0240218 A1* | 10/2011 | Nelson | B29C 70/38 156/272.2 |
| 2012/0186730 A1 | 7/2012 | Shindo et al. | |
| 2012/0298309 A1 | 11/2012 | Arakawa et al. | |
| 2012/0325398 A1 | 12/2012 | Silcock et al. | |
| 2013/0129526 A1* | 5/2013 | Williams | B29C 70/88 416/244 R |
| 2014/0061974 A1* | 3/2014 | Tyler | B33Y 80/00 264/401 |
| 2014/0342028 A1 | 11/2014 | Kwon et al. | |
| 2017/0291377 A1 | 10/2017 | Tsuji et al. | |
| 2018/0361685 A1 | 12/2018 | Yasuke et al. | |

FOREIGN PATENT DOCUMENTS

| | | |
|---|---|---|
| JP | S49-12104 B1 | 3/1974 |
| JP | H10-305490 A | 11/1998 |
| JP | H11-34073 A | 2/1999 |
| JP | 2003-42056 A | 2/2003 |
| JP | 2004-006255 A | 1/2004 |
| JP | 2010-173100 A | 8/2010 |
| JP | 2013-006415 A | 1/2013 |
| JP | 2013-209626 A | 10/2013 |
| JP | 2015-160433 A | 9/2015 |
| WO | 2011/078336 A1 | 6/2011 |
| WO | 2015/152331 A1 | 10/2015 |
| WO | 2016/047141 A1 | 3/2016 |

OTHER PUBLICATIONS

Translation of Office Action dated Feb. 6, 2019, in connection with European Patent Application No. 16811618.4.
International Search Report dated Aug. 24, 2016, mailed Sep. 6, 2016.
English Translation of International Search Report dated Aug. 24, 2016, mailed Sep. 6, 2016.
Notice of Reasons for Refusal for corresponding Japanese Patent Application No. 2016-568451 dated Feb. 21, 2017.
Translation of Search Report dated Aug. 9, 2019, in connection with European Patent Application No. 16868498.3.
Final Rejection Office Action in related U.S. Appl. No. 15/777,032 dated Jan. 27, 2021, pp. 1-16.
Final Rejection Office Action in related application US 15/777,032 dated Feb. 4, 2022, pp. 1-17.

* cited by examiner

MOLDING APPARATUS AND MANUFACTURING METHOD

This application is a 371 of PCT/JP2016/067667, filed Jun. 14, 2017, which claims foreign priority benefit under 35 U.S.C. § 119 of the Japanese Patent Application No. 2015-121407 filed Jun. 30, 2016, the disclosures of which are incorporated herein by reference.

TECHNICAL FIELD

The present invention relates to a molding apparatus for molding a fiber reinforced resin material into a molded item and a method for manufacturing the molded item.

BACKGROUND ART

Molded items range from large wind turbine blades, airplane wings, and to airplane bodies. Such molded items are manufactured through, for example, a preform process of laminating reinforcing fibers in a mold, a pressurizing process of pressurizing the preform by, for example, decompressing the inside of a bag containing the preform, a resin injection process of injecting a resin into the decompressed bag (preform), and a curing process of curing the injected resin (refer to, for example, Patent Literature 1).

CITATION LIST

Patent Literature

Patent Literature 1: Japanese Unexamined Patent Application Publication No. 2003-42056

SUMMARY OF INVENTION

Technical Problems

The above technique uses textile-form reinforcing fibers that have less fiber waviness or fiber deformation. However, reinforcing fibers (dry fibers) (a fiber bundle or a fiber tow) can easily have waviness or deformation when oriented unidirectionally. Fibers with more waviness or deformation can have lower mechanical properties. Increasing the thickness of a molded item to compensate for such lower mechanical properties can increase the cost or the weight of the molded item.

Waviness or deformation of reinforcing fibers can also affect small molded items, in addition to large molded items.

In response to the above issue, one or more aspects of the present invention are directed to a molding apparatus and a manufacturing method that reduce waviness or deformation of unidirectionally oriented reinforcing fibers.

Solution to Problems

A molding apparatus according to one aspect of the present invention includes a fiber feeder that feeds fibers, a resin feeder that feeds a resin, a curing accelerator that accelerates curing of the fed resin while the fed fibers are being tensioned, and a transporter that relatively changes a feeding position of the fibers, a feeding position of the resin, and an accelerating position of the curing.

A manufacturing method according to another aspect of the present invention includes feeding fibers, feeding a resin, accelerating curing of the fed resin while the fed fibers are being tensioned, and relatively changing a feeding position of the fibers, a feeding position of the resin, and an accelerating position of the curing.

Advantageous Effects of Invention

The aspects of the present invention accelerate curing of a resin that is fed while fibers are being tensioned. The resultant fibers have less waviness or deformation.

DESCRIPTION OF EMBODIMENTS

Overview

Figure 1:
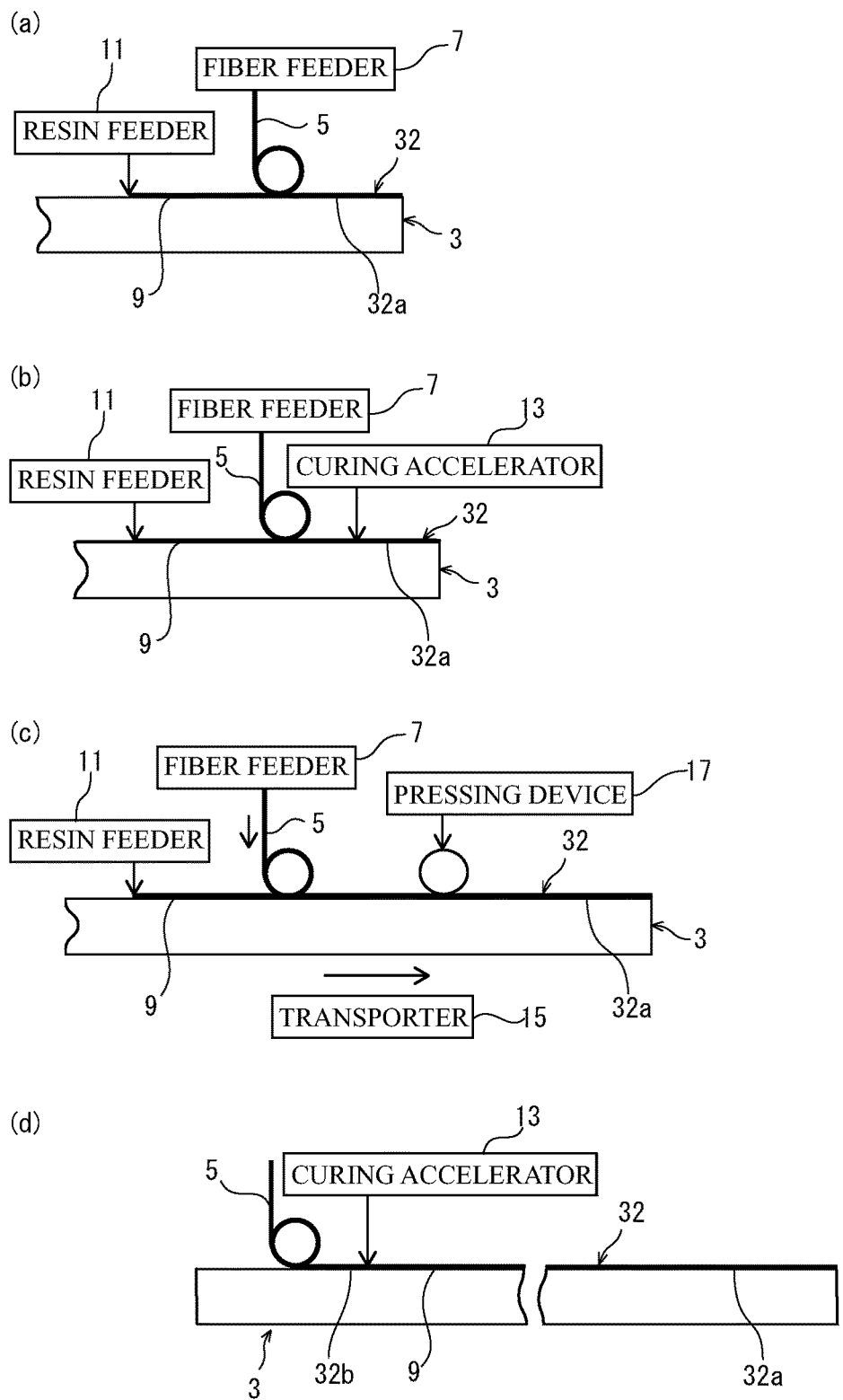
FIGS. 1A to 1D are schematic diagrams of a molding apparatus.

As shown in FIGS. 1A to 1D, a molding apparatus 1 according to one embodiment includes a fiber feeder 7, which feeds fibers (a fiber bundle or a fiber tow), 5, a resin feeder 11, which feeds a resin 9, a curing accelerator 13, which accelerates curing of the fed resin 9 while the fed fibers 5 are being tensioned, and a transporter 15, which relatively changes a feeding position of the fibers 5, a feeding position of the resin 9, and an accelerating position of curing.

In the example shown in FIGS. 1A to 1D, a mold 3, which is long in a first direction, has a lamination area 32, to which the fibers 5 and the resin 9 are fed when the feeding positions of the fibers and the resin are changed relatively. In the example shown in FIGS. 1A to 1D, the first direction of the lamination area 32 is identical to the longitudinal direction of the mold 3.

The fiber feeder 7 feeds the fibers 5 to a first end 32a of the lamination area 32, which is a feeding position of the fibers 5, while the fibers 5 are being tensioned. The resin feeder 11 feeds the resin 9 to the first end 32a of the lamination area 32, which is a feeding position of the resin 9. The transporter 15 in the example of FIG. 1C moves the mold 3 in the first direction to have the first end 32a of the lamination area 32 as its front end in the movement direction. In the example of FIGS. 1A to 1D, the feeding positions of the fibers 5 and the resin 9 and the curing accelerating position are fixed, whereas the mold 3 moves. More specifically, the feeding positions and the accelerating position are fixed, whereas the lamination area 32 moves to feed the fibers 5 and the resin 9 to the area that ranges from the first end 32a to a second end 32b of the lamination area 32.

The curing accelerator 13 accelerates curing of the resin 9 fed to the first end 32a of the lamination area 32 until the fibers 5 fed to the first end 32a of the lamination area 32 become unremovable from the resin 9 fed to the first end 32a of the lamination area 32 (in other words, until the fibers 5 are fixed by the resin 9). The fed fibers 5 remain tensioned to have less waviness or deformation.

The fiber feeder 7 feeds the fibers 5 to the area to which the resin 9 is fed. This enhances impregnation of the fibers with the resin.

The molding apparatus 1 will now be described in detail with reference to FIGS. 1A to 1D. The molding apparatus 1 includes the resin feeder 11 and the fiber feeder 7, which first feed the resin 9 and the fibers 5 to the first end 32a of the lamination area 32 as shown in FIG. 1A, and further includes the curing accelerator 13, which then accelerates curing of the resin 9 in the first end 32a of the lamination area 32 as shown in FIG. 1B. The molding apparatus 1 further includes, as shown in FIG. 1C, the transporter 15, which then transports the mold 3 in the first direction to have the first end 32a of the lamination area 32 as its front end in the movement direction, while the resin 9 and the fibers 5 are continuously being fed. When the resin 9 and the fibers 5 are fed to the second end 32b of the lamination area 32 by moving the mold 3, the curing accelerator 13 in the molding apparatus 1 accelerates curing of the resin 9 in the second end 32b of the lamination area 32, while the fibers 5 fed to the lamination area 32 are being tensioned (remain tensioned) as shown in FIG. 1D.

The molding apparatus 1 may include an impregnator. As shown in FIG. 1C, the impregnator may be a pressing device 17, which is arranged downstream from the resin feeder 11 and the fiber feeder 7 to press the fed fibers 5 against the mold 3. The molding apparatus 1 may further include a curing device. When using a separate device that cures the laminate of the resin 9 and the fibers 5, the above molding apparatus may also serve as a lamination apparatus. In other words, the above molding apparatus may serve either as a molding apparatus or a lamination apparatus depending on the degree to which the resin 9 is cured.

The molding apparatus 1 described above feeds the fibers 5 and the resin 9 to implement a manufacturing method for manufacturing a molded item from a fiber reinforced resin material.

The manufacturing method includes a fiber feeding process of feeding the fibers 5, a resin feeding process of feeding the resin 9, a curing acceleration process of accelerating curing of the resin 9 fed while the fed fibers 5 are being tensioned, and a moving process of relatively changing the feeding position of the fibers 5, the feeding position of the resin 9, and the curing accelerating position.

In other words, the manufacturing method includes feeding the fibers 5 and the resin 9, accelerating curing of the resin 9 fed while the fed fibers 5 are being tensioned, and relatively changing the feeding position of the fibers 5, the feeding position of the resin 9, and the curing accelerating position.

Relatively changing the positions herein includes moving the mold 3 (lamination area 32) while fixing the feeding position of the fibers 5, the feeding position of the resin 9, and the curing accelerating position; changing the feeding position of the fibers 5, the feeding position of the resin 9, and the curing accelerating position while fixing the mold 3 (lamination area 32); and moving the mold 3 (lamination area 32) and changing the feeding position of the fibers 5, the feeding position of the resin 9, and the curing accelerating position.

The fibers 5 herein refer to continuous fibers without a resin adhering to the fibers to form a fiber reinforced resin matrix. The fibers 5 may be the same fibers or may contain different fibers. Examples of such fibers include carbon fibers, glass fibers, aramid fibers, boron fibers, and metal fibers.

The resin 9 may be a thermosetting resin or a thermoplastic resin. Examples of thermosetting resins include an epoxy resin, a vinyl ester resin, a bismaleimide resin, a polyimide resin, a cyanate ester resin, a phenolic resin, a melamine resin, a benzoxazone resin, an unsaturated polyester resin, a silicone resin, and a polyurethane resin. In one or more embodiments of the present invention, a mixture of any of these resins may be used. Such resins may further contain a denaturant such as a thermoplastic resin, a fire retardant, an inorganic filler, or an internal mold release agent, or other additives.

Examples of thermoplastic resins include a polyethylene resin, a polypropylene resin, or a polyolefin-based resin, which is a copolymer or a blend of a polyethylene resin and a polypropylene resin, an aliphatic polyamide-based resin, such as polyamide 66, polyamide 6, or polyamide 12, a semi-aromatic polyamide-based resin containing an aromatic component as an acid component, an aromatic polyester-based resin such as a polyethylene terephthalate resin (PET) or a polybutene terephthalate resin (PBT), a polycarbonate-based resin, a polystyrene-based resin such as a polystyrene resin, an acrylonitrile styrene resin (AS), or an acrylonitrile butadiene styrene resin (ABS), an aliphatic polyester-based resin such as a polyacted resin, a polysulfone resin (PSu), a polyethersulfone resin (PES), a polyether-imide resin (PEI), a polyether-ketone resin (PEK), and a polyetheretherketone resin (PEEK). In one or more embodiments of the present invention, a mixture of any of these resins may also be used.

The resin 9 is an uncured or unset resin material. The resin 9 is not limited. The resin 9 may be a thermosetting resin or a photosetting (ultraviolet or infrared-curable) resin. The resin 9 may be applied, ejected, or may be provided in a film.

The fibers 5 may be fed before or after the resin 9 is fed. The laminate includes the fibers 5 and the resin 9. When, for example, the fibers 5 are fed before the resin 9 is fed, the lamination area actually contains no laminate until the resin 9 is fed, despite its name. However, the lamination area herein includes such areas containing only the fibers 5 or the resin 9.

Accelerating curing of the resin herein refers to applying energy to the resin to accelerate its curing, and does not include acceleration of resin curing in natural environments. In other words, accelerating curing of the resin refers to accelerating curing of the resin at a rate faster than in natural environments. Accelerating curing of a thermosetting resin is performed by applying thermal energy to the resin, and accelerating curing of a photosetting resin is performed by applying light energy to the resin.

Accelerating curing of a thermoplastic resin equates to accelerating setting of the resin, and thus refers to setting at a rate faster than in natural environments. Accelerating setting of a resin can be performed by blowing, onto the resin, a gas such as air that is cooler than the resin, or by placing a cooling member that is cooler than the resin into contact with the resin.

Accelerating curing of the resin 9 refers to accelerating curing of the resin 9 until the fibers 5 become unremovable from the fed resin 9 under the tension applied on the fibers 5. The resin 9 may be cured either incompletely or completely. The fibers 5 may be placed under the tension either when the fibers are fed or when the mold 3 is moved.

The curing accelerator 13 accelerates curing of the resin 9 until the fibers 5 become unremovable under the tension from the resin 9 that is fed and has undergone accelerated curing. This structure allows the fibers 5 to remain tensioned when, for example, the mold 3 is moved relatively.

The molding apparatus 1 may include a pressing device 17 as an example of the impregnator. The pressing device 17 applies a pressure acting perpendicularly to the fiber direction on the fed fibers 5 and the resin 9 while the fed fibers 5 remain tensioned. This facilitates impregnation of the fibers 5 with the resin 9.

The fiber feeder 7 may feed the fibers 5 to the area to which the resin 9 has been fed. This facilitates impregnation of the fibers 5 with the resin 9. In this case, the fiber feeder 7 feeds the fibers 5 to the surface (surface opposite to the mold 3) of the resin 9 fed to the lamination area 32.

Embodiments

Embodiments will now be described in detail with reference to the drawings.

A molded item in one example is a thin long plate. A molding apparatus that shapes a molded item that is long in a first direction and has a width that is greater than its thickness, as well as a method for manufacturing the molded item will now be described.

1. Overall Structure

Figure 2:
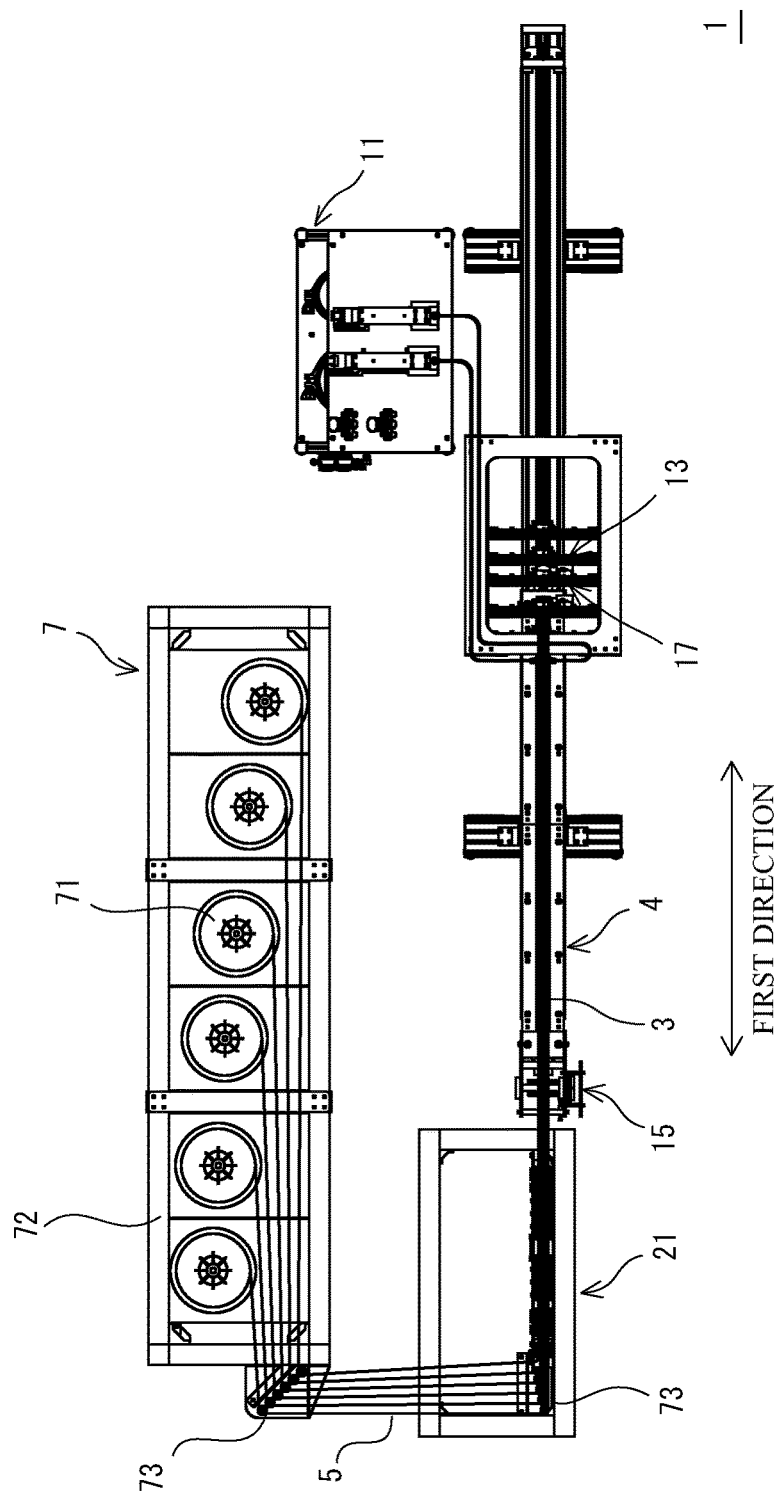
FIG. 2 is a plan view of the molding apparatus.

As shown mainly in FIG. 2, the molding apparatus 1 includes a mold 3, which is long in a first direction, a mold support device 4, which is reciprocable in the first direction and supports the mold 3, a fiber feeder 7, which feeds the fibers 5 to the lamination area 32 of the mold 3, a resin feeder 11, which feeds the resin 9 to the lamination area 32 of the mold 3, a curing accelerator 13, which accelerates curing of the resin 9 that has been fed into the mold 3, and a transporter 15 (refer to FIG. 4), which reciprocates the mold 3 in the first direction.

A downstream side herein refers to the side to which the fibers 5 fed or to be fed travel, whereas an upstream side refers to the side opposite to the side to which the fibers travel. The upstream side or the downstream side simply used herein refers to the side relative to the fibers 5.

In addition to the above components, the molding apparatus 1 may also include at least one of the pressing device 17, which applies a pressure to the fibers 5 and the resin 9 that have been fed in the mold 3, a sheet feeder 19 (refer to FIG. 12A), which feeds a sheet 191 for covering the resin 9 and the fibers 5 that have been fed in the mold 3, a sheet collecting device that collects the fed sheet 191, and an opening device 21, which opens the fibers 5 that are to be fed into the mold 3.

The molding apparatus 1 according to one embodiment includes the mold 3, the mold support device 4, the fiber feeder 7, the resin feeder 11, the curing accelerator 13, the transporter 15, the pressing device 17, the sheet feeder 19, and the opening device 21. This structure feeds the opened fibers 5 and the resin 9 into the mold 3 or the moving mold 3.

These components will now be described.

2. Components (1) Mold

Figure 3:
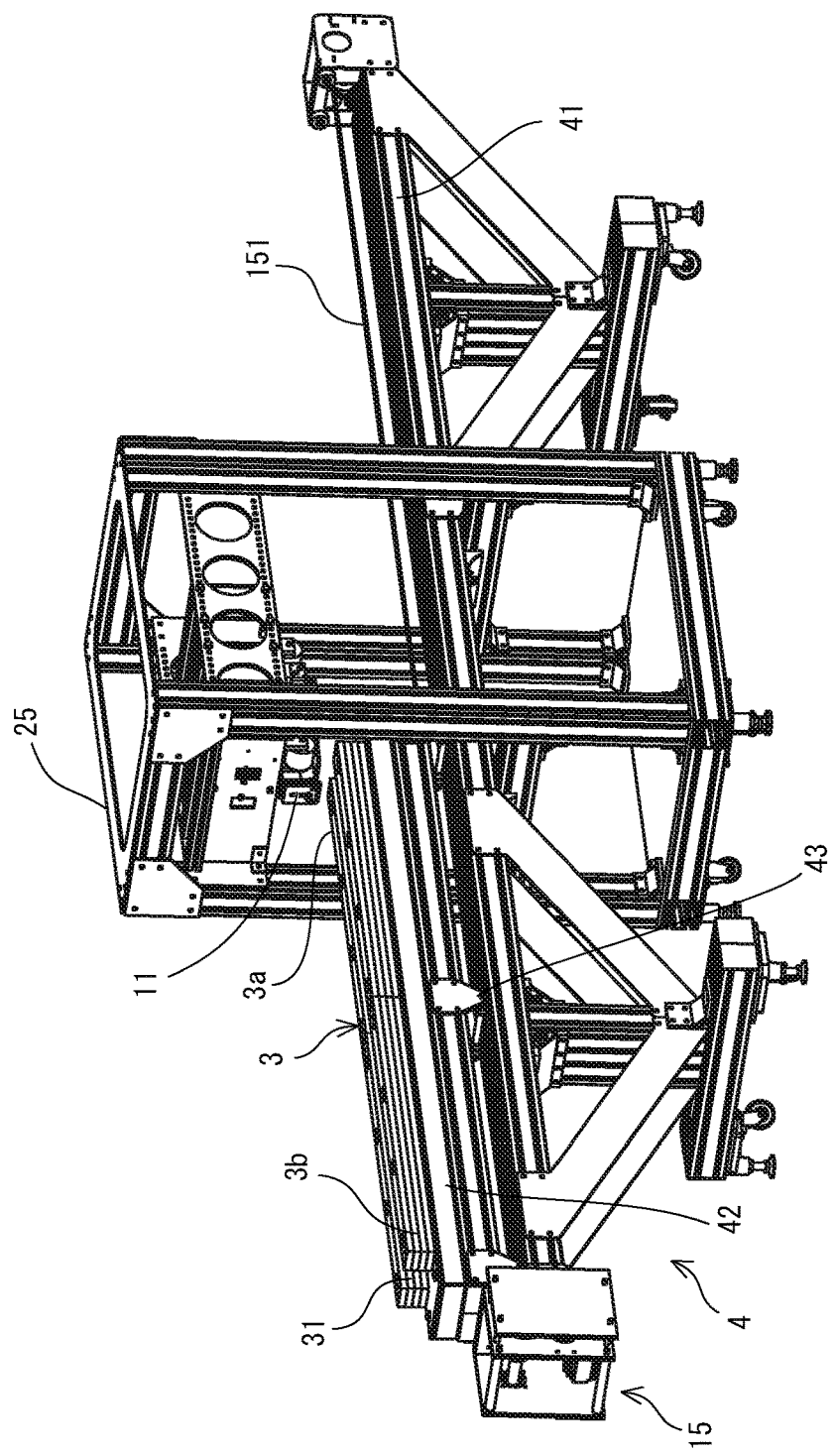
FIG. 3 is a perspective view of a transporter, a fiber feeder, a curing accelerator, and a pressing device.
Figure 4:
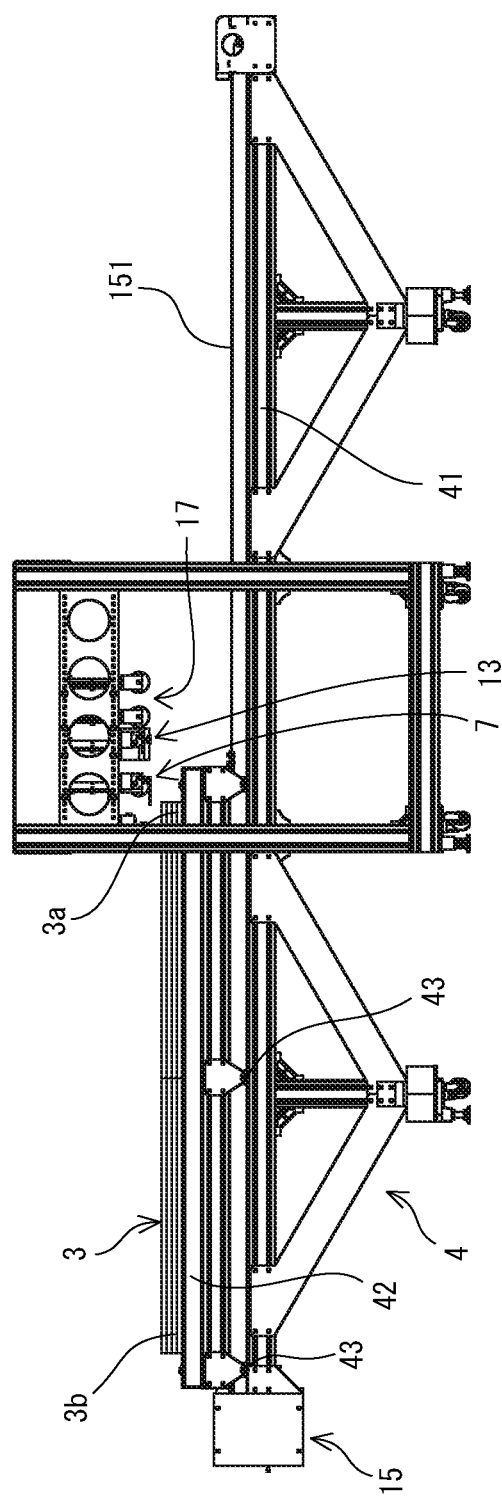
FIG. 4 is a front view of the transporter, the fiber feeder, the curing accelerator, and the pressing device.
Figure 5:
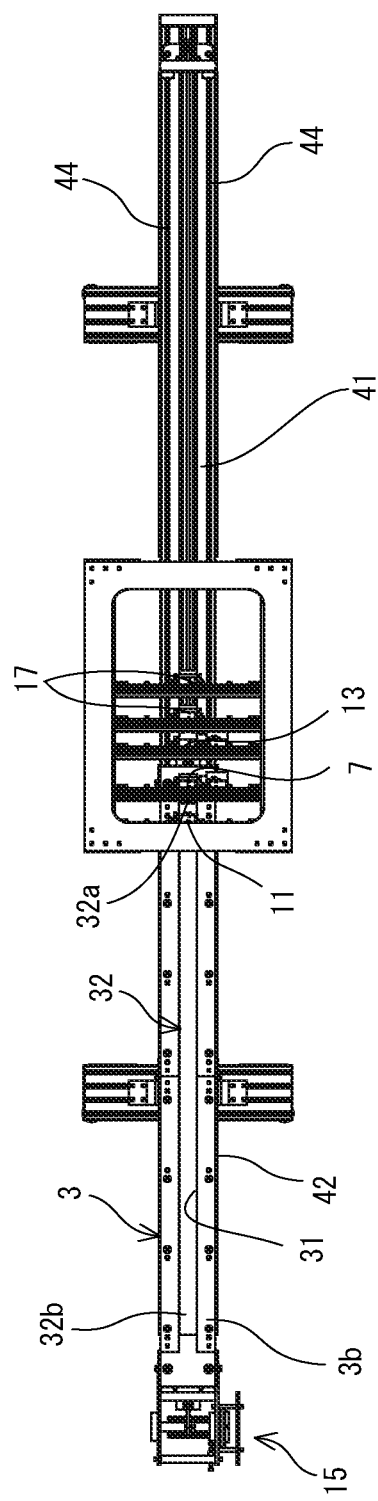
FIG. 5 is a plan view of the transporter, the fiber feeder, the curing accelerator, and the pressing device.

The mold 3 will be described mainly with reference to FIGS. 3 to 5.

The mold 3 has a recess 31 that may be shaped in correspondence with the cross-sectional shape of a molded item. The recess 31 defines the lamination area 32 inside, which allows the fibers 5 and the resin 9 to be laminated together. The resin 9 and the fibers 5 are fed to the lamination area 32 in the recess 31. The mold 3 is mounted on the mold support device 4. The mold 3 on the mold support device 4 has its longitudinal direction identical to the first direction.

When the resin 9 and the fibers 5 are fed to the bottom surface of the recess 31, the bottom surface serves as the lamination area. When the resin 9 and the fibers 5 are fed to the top surface of the previously laminated resin 9 and the fibers 5 (the resin 9 and the fibers 5 may together be referred to as the laminate) in the recess 31, the top surface of the previous laminate serves as the lamination area.

In this example, the lamination area 32 is long in the first direction. A front end portion 32a of the lamination area 32 is aligned with a front end portion 3a of the mold 3. A rear end portion 32b of the lamination area 32 is aligned with a rear end portion 3b of the mold 3. These end portions of the lamination area 32 may not be aligned with the corresponding end portions of the mold 3. For example, the lamination area 32 may be defined in a center portion, a front portion, a rear portion, or a plurality of (e.g., two) portions of the mold 3, which is long in the first direction.

The front end portion is an example of the first end described in the Overview section, and refers to an end nearer the portions of the fibers 5 and the resin 9 that start being fed. The rear end portion is an example of the second end described in the Overview section, and refers to as an end nearer the portions of the fibers 5 and the resin 9 that stop being fed. In the direction of relative movement, the front end portion may refer to an end in the movement direction (advancing direction).

(2) Mold Support Device

The mold support device 4 will be described mainly with reference to FIGS. 2 to 5.

The mold support device 4 includes a fixed table 41, which is long in the first direction, and a movable table 42, which is reciprocable in the first direction on the top surface of the fixed table 41. Although a moving mechanism for the movable table 42 is not limited, the movable table 42 includes wheels 43 in the present embodiment. The movable table 42 advances in a direction that extends (widens) the range over which the fibers 5 and the resin 9 are fed. The moveable table 42 retracts in the direction opposite to the advancing direction.

The movable table 42 includes a plurality of (three) pairs of wheels 43, which are rotatable in the advancing or retracting direction, and are spaced from one another in the first direction. Each pair of wheels 43 includes a right wheel and a left wheel extending in the first direction. The fixed table 41 has, on its top surface, a pair of grooves 44 that extends in the first direction. The pair of grooves 44 includes a right groove and a left groove in the first direction. The movable table 42 reciprocates in the first direction with one pair of wheels 43 of the movable table 42 rotating within the pair of grooves 44 of the fixed table 41. This structure allows the movable table 42 to reciprocate (advance and retract) on the same path.

When the movable table 42 is at the rearmost position in the first direction (before moved), the movable table 42 is at a standby position. When the movable table 42 is at the foremost position after advancing (after moved), the movable table 42 is at a finish position.

(3) Fiber Feeder

Figure 6:
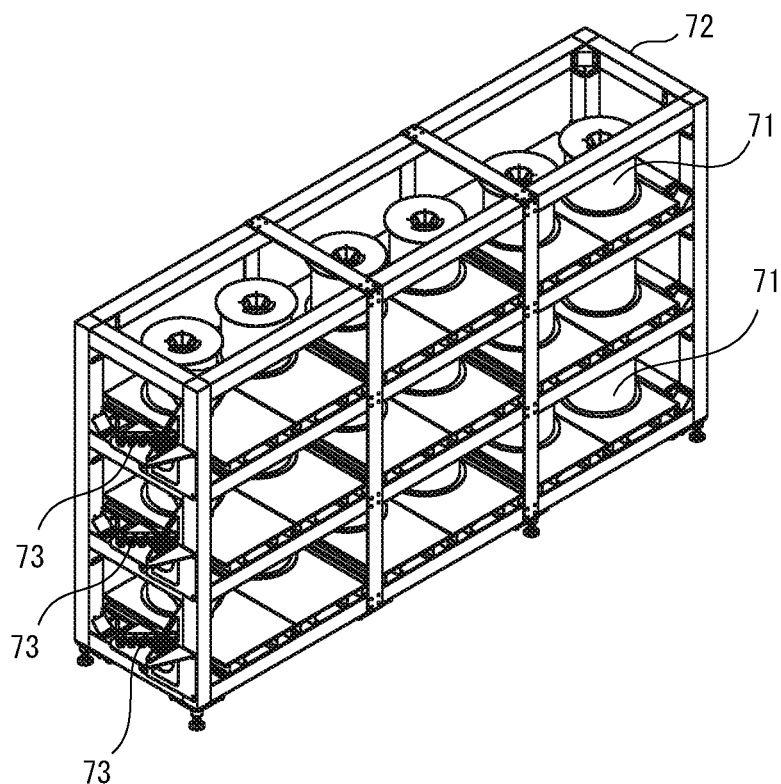
FIG. 6 is a perspective view of the fiber feeder.
Figure 7:
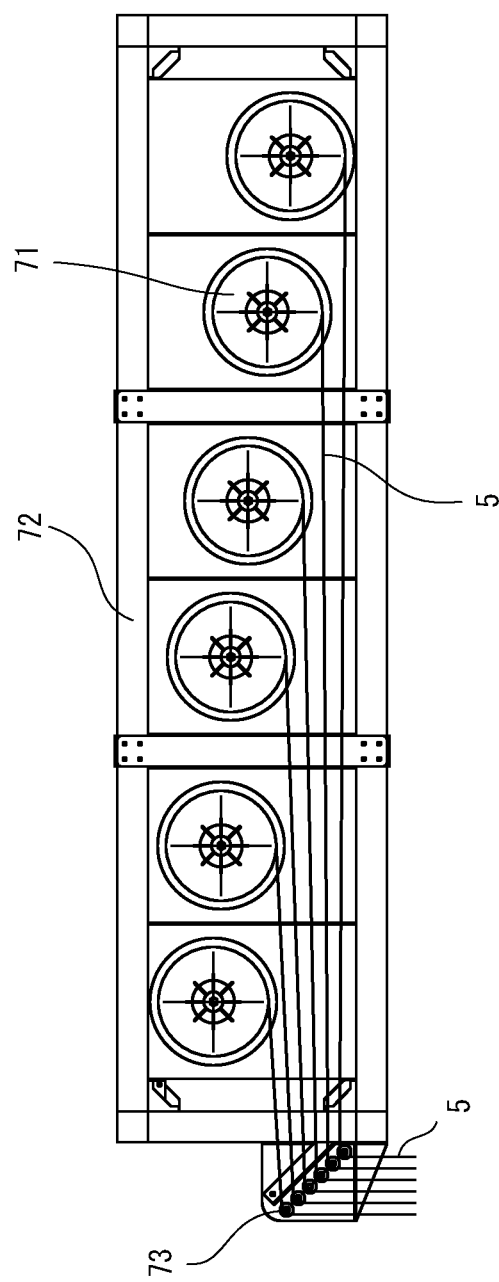
FIG. 7 is a plan view of the fiber feeder.

The fiber feeder 7 will be described with reference to FIGS. 2, 6, and 7.

The fiber feeder 7 guides the fibers 5, which are drawn from, for example, rovings 71, to the feeding position. The feeding position at which the fibers 5 start being fed is at the front end portion 32*a* of the lamination area 32 of the mold 3 at the standby position.

In the present embodiment, the feeding position of the fibers 5 is fixed (stationary), and the mold 3 moves (advances) to feed the fibers 5 across the entire lamination area 32. In other words, the fiber feeder 7 feeds the fibers 5 from the front end portion 3*a* to the rear end portion 3*b* of the advancing mold 3.

The fiber feeder 7 includes a support rack 72, which supports the rovings 71, guide rollers 73, which guide the fibers 5 drawn from the rovings 71 toward the feeding position, and a roller 74 (refer to FIG. 8), which feeds the guided fibers 5 while pressing the fibers 5 against the mold 3. The roller 74 is arranged at the feeding position of the fibers 5.

Figure 8:
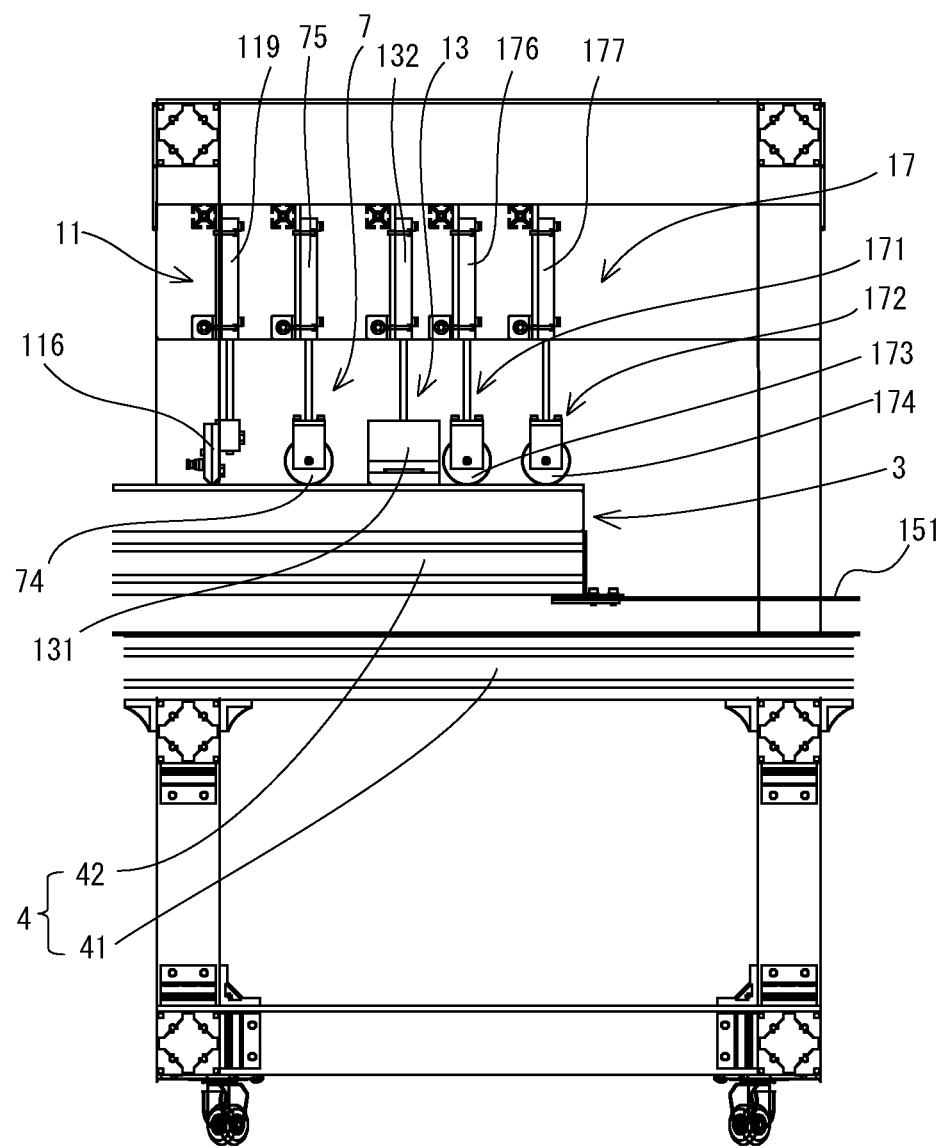
FIG. 8 is an enlarged front view of the fiber feeder, the curing accelerator, and the pressing device.

The roller 74 is driven to rotate as the mold 3 advances. The guided fibers 5 are fed continuously to the mold 3. As shown in FIG. 8, the roller 74 is supported by an actuator 75 in a manner movable in a direction toward and away from the mold 3 (in the vertical direction in this example).

(4) Resin Feeder

Figure 9:
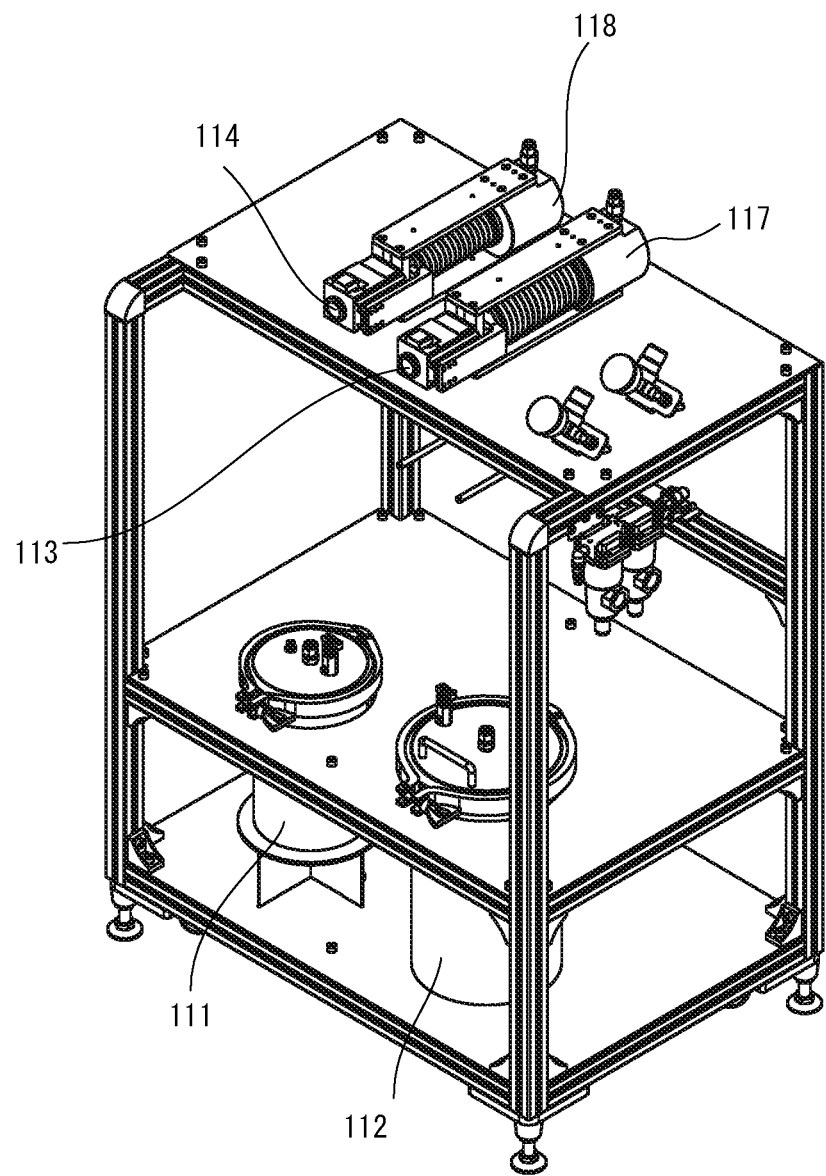
FIG. 9 is a perspective view of a portion of the resin feeder.

The resin feeder 11 will be described with reference to FIGS. 8 and 9.

The resin feeder 11 feeds the resin 9 at the feeding position. As in feeding the fibers 5, the feeding position at which the resin 9 starts being fed is at the front end portion 32*a* of the lamination area 32 of the mold 3 at the standby position.

In the present embodiment, the feeding position of the resin 9 is fixed (stationary), and the mold 3 moves (advances) to feed the resin 9 across the entire lamination area 32. In other words, the resin feeder 11 feeds the resin 9 from the front end portion 3*a* to the rear end portion 3*b* of the advancing mold 3.

The resin feeder 11 according to the present embodiment includes an ejecting unit that ejects the resin 9, although a unit for feeding the resin 9 is not limited. The resin 9 may be a curable resin.

The ejecting unit includes a base component storage tank 111, which stores a base component, a curing-agent storage tank 112, which stores a curing agent, a base component discharging cylinder 113, which feeds the base component from the base component storage tank 111 to a mixer, a curing-agent discharging cylinder 114, which feeds the curing agent from the curing-agent storage tank 112 to a mixer, a mixer that mixes the base component and the curing agent fed to the mixer, and an ejection nozzle 116, which ejects the mixed resin 9. The ejection nozzle 116 is arranged at the feeding position of the resin 9.

The discharging cylinders 113 and 114 are driven by actuators 117 and 118. The ejection nozzle 116 is supported by an actuator 119 in a manner movable toward and away from the mold 3 (in the vertical direction in this example).

The ejection nozzle 116 in the resin feeder 11 is arranged upstream from the roller 74 in the fiber feeder 7. More specifically, the resin feeder 11 feeds the resin 9 into the mold 3 before the fibers 5 are fed into the mold 3.

(5) Curing Accelerator

The curing accelerator 13 will be described with reference to FIG. 8.

The curing accelerator 13 applies energy for accelerating curing of the resin 9 fed into the mold 3 to the resin 9. For example, the curing accelerator 13 applies thermal energy to a thermosetting resin 9, and light energy to a photosetting resin 9.

The resin 9 in the present embodiment is a thermosetting resin. The curing accelerator 13 thus includes an energy applying unit that applies thermal energy to the resin 9. Although the energy applying unit is not limited, the curing accelerator 13 according to the present embodiment includes an iron 131 as an energy applying unit. The iron 131 is supported by an actuator 132 in a manner movable toward and away from the mold 3 (in the vertical direction in this example).

The curing accelerator 13 may include a single iron 131, or a plurality of irons 131 in the first direction. The curing accelerating position is the position at which the energy is applied, or specifically the position at which the iron 131 is arranged. In the present embodiment, the curing accelerating position is fixed (stationary), and curing of the resin 9 fed across the entire lamination area 32 is accelerated by moving (advancing) the mold 3.

(6) Transporter

The transporter 15 will be described with reference to FIGS. 3 and 4.

The transporter 15 may move (advance) the movable table (mold) 42 in the mold support device 4 at least from the standby position to the finish position. The transporter 15 herein allows the movable table 42 to reciprocate in the first direction. More specifically, the transporter 15 allows the movable table 42 to advance from the standby position to the finish position, and to retract from the finish position to the standby position.

Although the moving method is not limited, the transporter 15 in the present embodiment includes a belt drive. The belt drive includes a belt 151 having one end attached to the front end portion of the movable table 42 and the other end attached to the rear end portion of the movable table 42, a belt roller (not shown) 153, which winds and unwinds the belt 151, and a motor (not shown) that drives and rotates the belt roller 153. The motor is arranged at the rear end portion of the fixed table 41.

(7) Pressing Device (Impregnator)

The pressing device 17 will be described with reference to FIG. 8.

The pressing device 17 applies a compressive force on the fibers 5 that have been fed in the mold 3. More specifically, the pressing device 17 presses the fibers 5 against the mold 3.

Although compressing (pressing) units that apply a compressive force (pressing force) are not limited, the pressing device 17 includes pressing rollers 171 and 172 as compressing units. The pressing roller 171 includes a roller 173 and an actuator 176. The pressing roller 172 includes a roller 174 and an actuator 177. Each of the rollers 173 and 174 has a rotation axis perpendicular to the first direction (axis extending laterally when viewed in the first direction). Each of the actuators 176 and 177 presses the corresponding roller 173 or 174 against the mold 3. The pressing device 17 is arranged downstream from (in front of) the curing accelerator 13.

A pressing position is the position at which the pressure acts, or herein refers to the position at which each of the rollers 173 and 174 is arranged. In the present embodiment, the pressing position is fixed (stationary), and the mold 3 moves (advances) to apply pressure across the entire area in which the fibers 5 have been fed.

For example, the roller 74 in the fiber feeder 7 may also serve as the pressing device 17. More specifically, the pressing device 17 may include a first compressing unit that uses the roller 74 in the fiber feeder 7, and a second compressing unit that uses the pressing rollers 171 and 172 arranged downstream from the curing accelerator 13.

For example, the iron 131 in the curing accelerator 13 may also serve as the pressing device 17. More specifically, the pressing device 17 may include a first compressing unit that uses the iron 131 in the curing accelerator 13, and a second compressing unit that uses the pressing rollers 171 and 172 arranged downstream from the curing accelerator 13.

(8) Sheet Feeder

Figure 12:
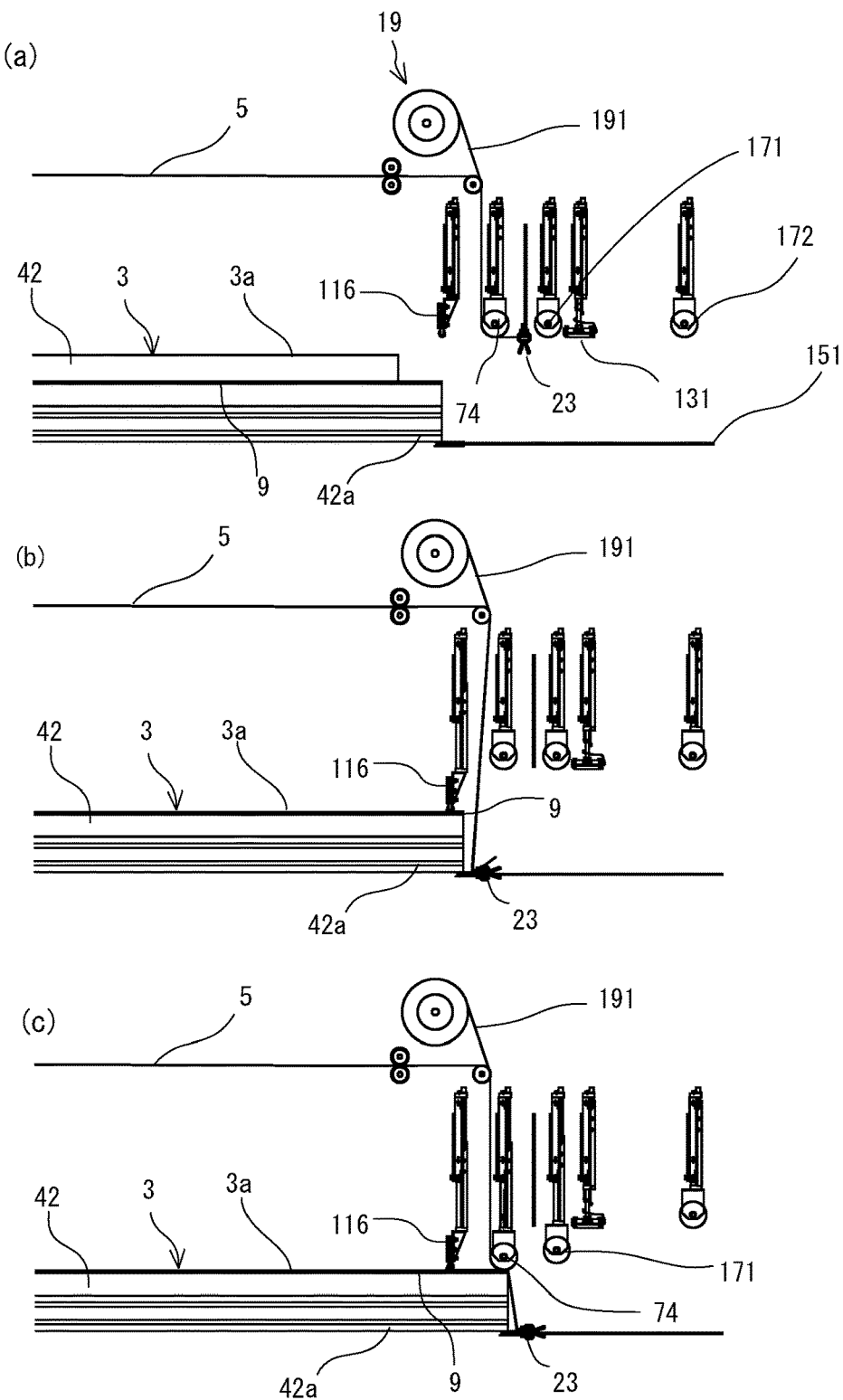
FIGS. 12A to 12C are diagrams describing the operation of the molding apparatus.
Figure 13:
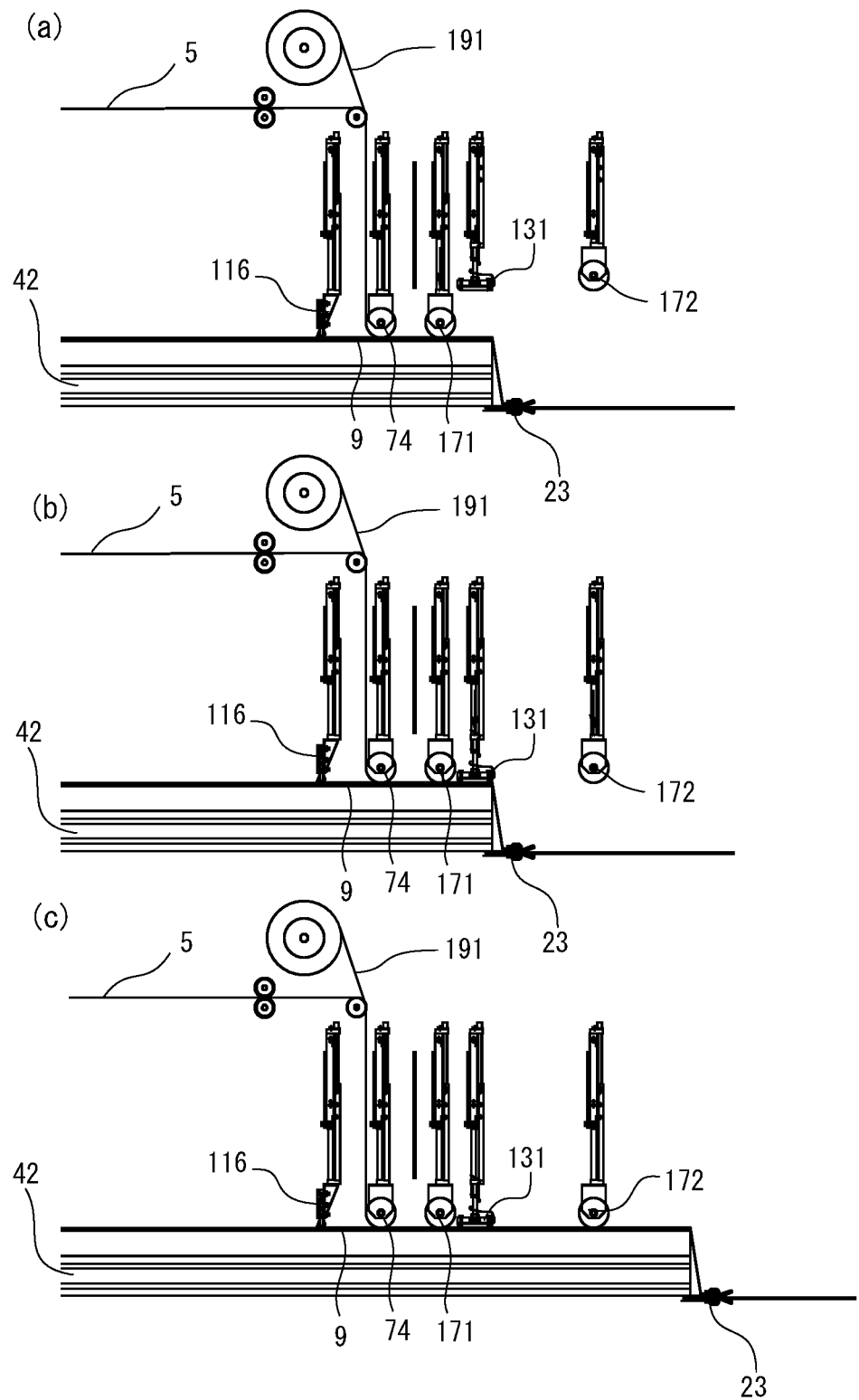
FIGS. 13A to 13C are diagrams describing the operation of the molding apparatus.
Figure 14:
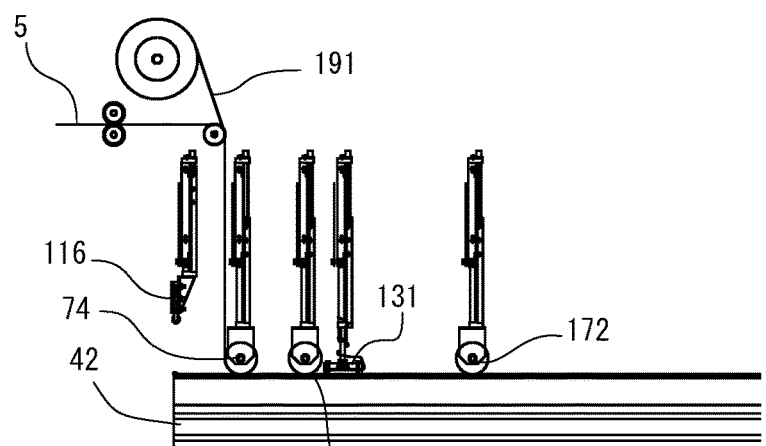
FIGS. 14A to 14C are diagrams describing the operation of the molding apparatus.
Figure 14:
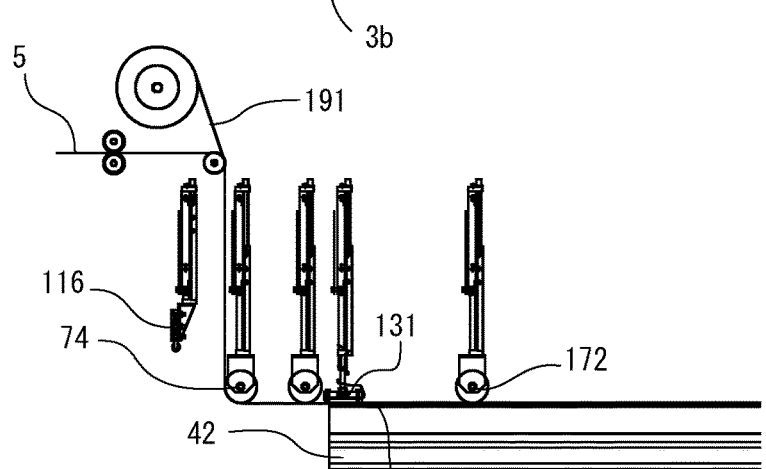
Figure 14:
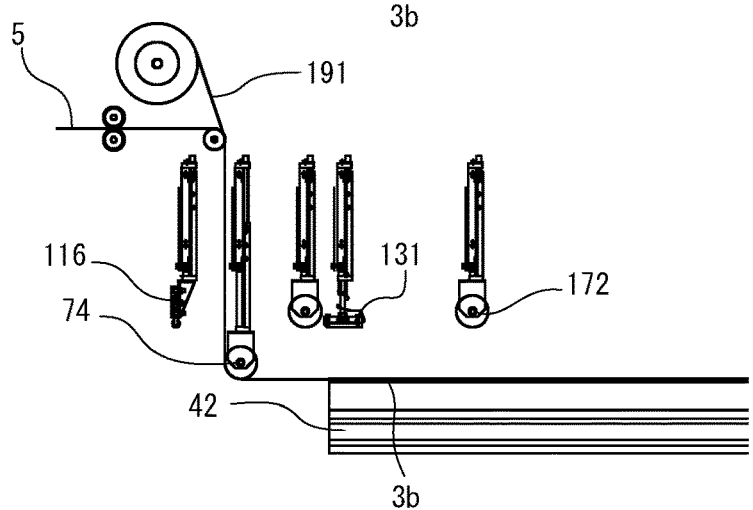
Figure 15:
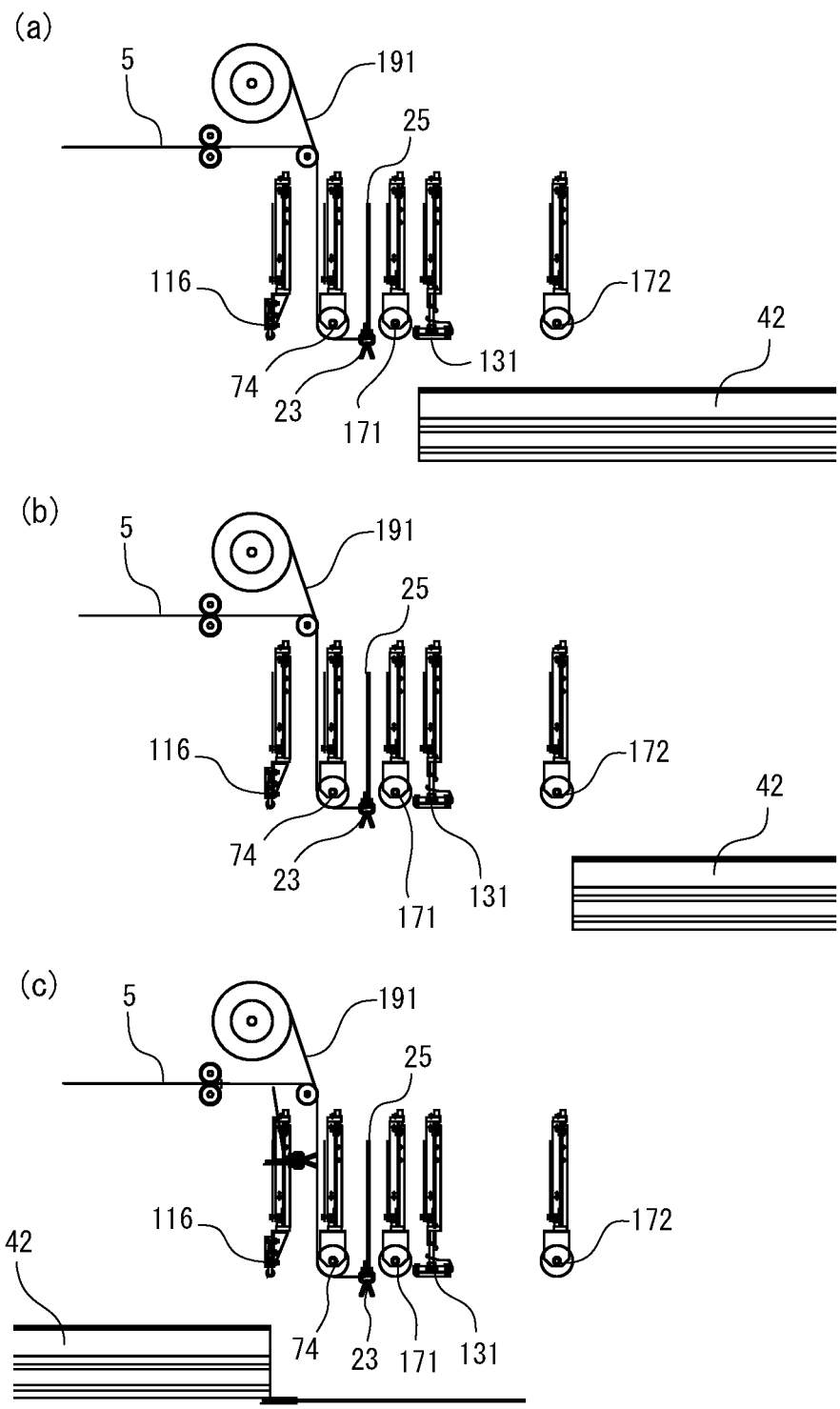
FIGS. 15A to 15C are diagrams describing the operation of the molding apparatus.

The sheet feeder 19 will be described mainly with reference to FIG. 12.

The sheet feeder 19 feeds a sheet to prevent the resin 9 from adhering to the roller 74 and the pressing rollers 171 and 172 when the fibers 5 and the resin 9 are pressed.

The sheet feeder 19 feeds a sheet 191 to the surfaces (opposite to the mold 3) of the fibers 5. Although not limited to a particular feeder for the sheet 191, the sheet feeder 19 includes a sheet feeding unit including a guide roller for guiding the sheet 191 toward the surfaces of the fibers 5, and a roller that presses the sheet 191 against the surfaces of the fibers 5.

The roller 74 in the fiber feeder 7 may also serve as the roller, and the guide rollers 73 in the fiber feeder 7 may also serve as the guide rollers.

(9) Opening Device

Figure 10:
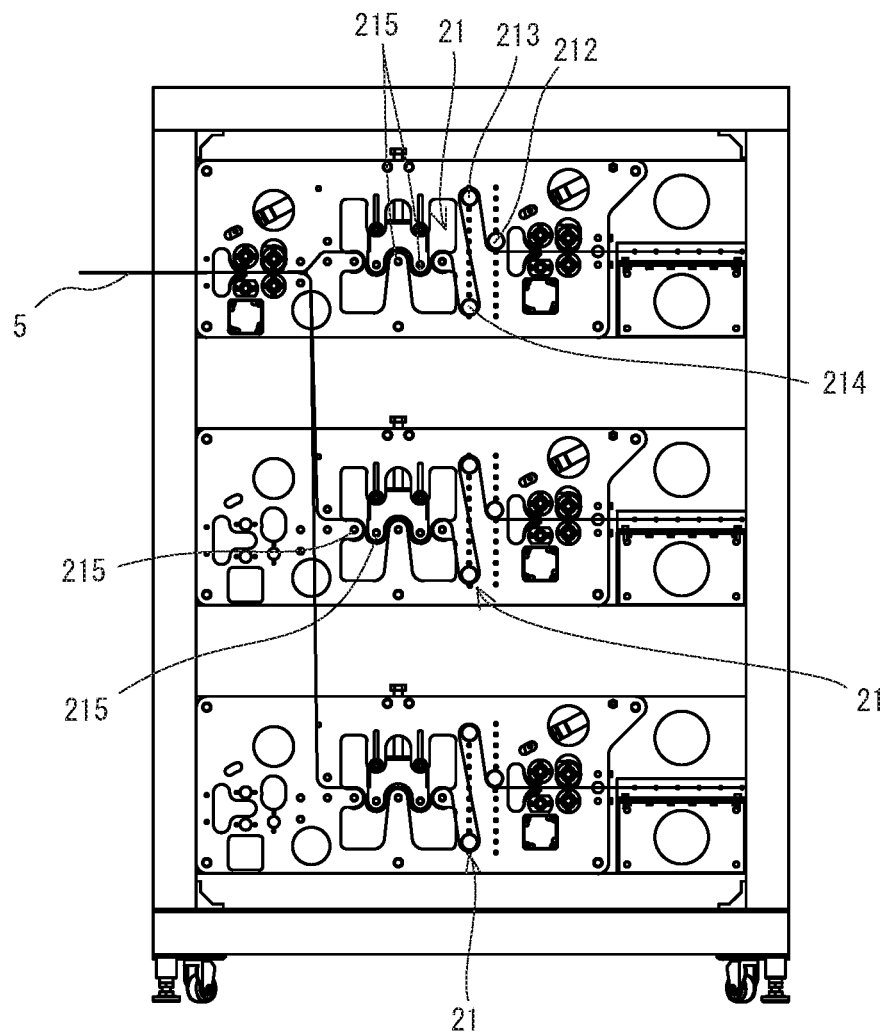
FIG. 10 is a front view of an opening device.
Figure 11:
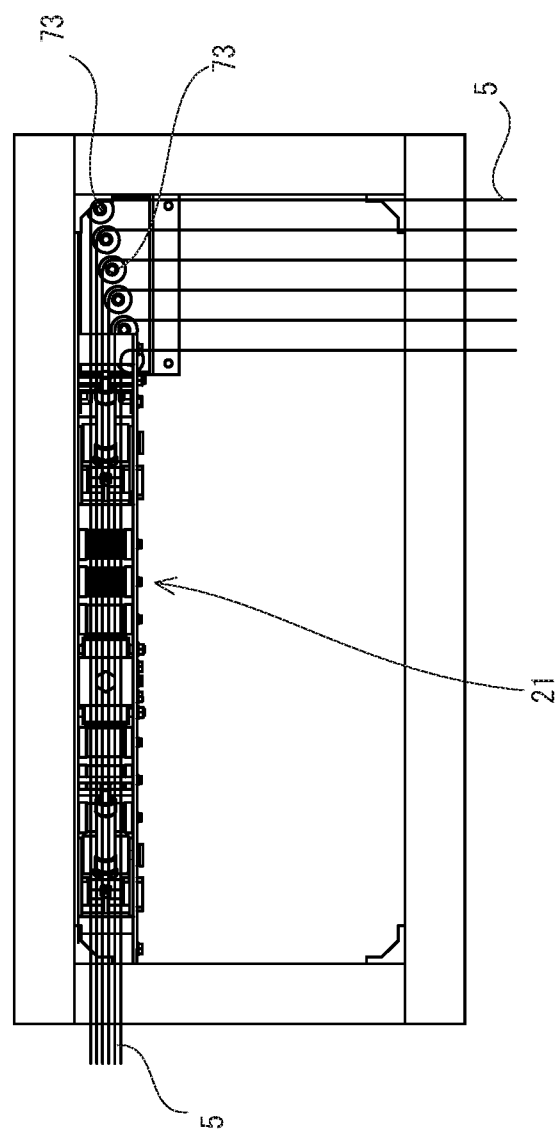
FIG. 11 is a plan view of the opening device.

The opening device 21 will be described with reference to FIGS. 2, 10, and 11.

The opening device 21 is arranged between the support rack 72 and the roller 74 (refer to FIG. 8) in the fiber feeder 7. Although the method for opening the fibers 5 (opening unit) is not limited, the opening device 21 includes a dancer roller 214 as an opening unit, which applies a pressure to the fibers 5.

The opening device 21 includes a plurality of rollers 212 to 215, at least one of which is a dancer roller (e.g., the roller 214) movable in the direction to increase or decrease the tension applied on the fibers 5. The tension increases when the roller moves downward. These rollers 212 to 215 are flat rollers.

The dancer roller 214 in the opening device 21 may also serve as a tensioning device for feeding the fibers 5 while the fibers 5 are being tensioned.

3. Lamination Process

FIGS. 12A to 15C are diagrams each describing the operation of the molding apparatus 1.

FIGS. 12A to 15C are enlarged views of main portions for easy understanding of ejection of the resin 9, laminating of the fibers 5, curing acceleration, and other operations. To simplify the drawings, the mold 3 is not shown in FIG. 12B and subsequent drawings.

As shown in FIG. 12A, the molding apparatus 1 includes, from its upstream, the ejection nozzle 116 for the resin feeder 11, the roller 74 in the fiber feeder 7, the pressing roller 171 in the pressing device 17, the iron 131 in the curing accelerator 13, and the pressing roller 172 in the pressing device 17. The pressing roller 172 in the pressing device 17 arranged most downstream prevents expansion of the laminate that may occur when the iron 131 heats the resin 9.

The operation of the molding apparatus 1 and processes included in the method for manufacturing, for example, a large molded item using the molding apparatus 1 will now be described. The front end portion 32a of the lamination area 32 hereafter equates to the front end portion 3a of the mold 3, and the rear end portion 32b of the lamination area 32 to the rear end portion 3b of the mold 3.

(1) Mold Alignment and Fixing of Fibers

As shown in FIG. 12A, the movable table 42 is positioned to place the front end portion 3a of the mold 3 upstream from the ejection nozzle 116 of the resin feeder 11. More specifically, the movable table 42 is positioned to have the front end portion 3a at the initial feeding position of the resin 9.

The fibers 5 are drawn from the rovings 71, guided toward the roller 74 in the fiber feeder 7 via the guide rollers 73 and the opening device 21, and then installed on a fixture 23.

The sheet 191 is fed to the surfaces of the fibers 5 by the sheet feeder 19 in parallel with the feeding of the fibers 5, and is then installed on the fixture 23 in parallel with the installation of the fibers 5.

(2) Fixing Fibers on Mold

As shown in FIG. 12B, the fixture 23 on which the fibers 5 and the sheet 191 are installed is fixed on the mold 3. Although the fixture 23 is fixed to a front end portion 42a of the movable table 42 in this example, the fixture 23 may be fixed to the mold.

The fibers 5 and the sheet 191 may be fixed on the extension line of the recess 31 of the mold 3 extending in the first direction when viewed from above. FIG. 12B shows the movable table 42 at the position slightly advanced from the position shown in FIG. 12A.

(3) Mold Movement and Resin Ejection

After the fixture 23 is fixed, the transporter 15 advances the movable table 42. In the operation described below, the movable table 42 advances. The movable table 42 advances when it is driven by a belt drive included in the transporter 15.

The ejection nozzle 116 in the resin feeder 11 is lowered when the front end portion 3a of the mold 3 approaches the ejection nozzle 116. When the front end portion 3a reaches under the ejection nozzle 116, as shown in FIG. 12B, the ejection nozzle 116 starts feeding (ejecting) the resin 9. The resin 9 is continuously fed by the ejection nozzle 116 ejecting the resin 9 toward the recess 31 of the mold 3 until the rear end portion 3b reaches under the ejection nozzle 116.

(4) Feeding Fibers

As shown in FIG. 12C, the roller 74 in the fiber feeder 7 is lowered when the front end portion 3a of the mold 3 approaches the roller 74. The roller 74 is placed in the recess 31 of the mold 3, and the fibers 5 are held between the lowered roller 74 and the mold 3. The roller 74 is rotated as the mold 3 advances. This structure enables continuous feeding of the fibers 5 while pressing the fibers 5 against the mold 3 without using a specific device.

The roller 74 is rotated as the mold 3 advances, and is thus less likely to damage the fibers 5. The sheet 191 is fed to the surfaces of the fibers 5. The sheet 191 protects the fibers 5 from, for example, damage when the fibers 5 are pressed by the roller 74. The sheet 191 placed between the resin 9 and the roller 74 also prevents the resin 9 from adhering to the roller 74.

(5) Pressing Resin and Fibers

As shown in FIG. 12C, the pressing roller 171 is lowered when the front end portion 3a of the mold 3 approaches the pressing roller 171. When the movable table 42 advances further, as shown in FIG. 13A, the pressing roller 171 presses the resin 9 and the fibers 5 fed to the front end portion 3a. This causes the fibers in the fibers 5 to be impregnated with the resin 9.

(6) Resin Curing Acceleration

As shown in FIG. 13B, the iron 131 is lowered when the front end portion 3a of the mold 3 approaches the iron 131. The iron 131 heats the resin 9 and the fibers 5 fed to the front end portion 3a (applies energy for curing acceleration to the resin 9). This operation accelerates curing of the resin 9. The acceleration may be continued until the tensioned fibers 5 become unremovable from at least the resin in which curing is accelerated.

The resin 9 used herein is a fast-cure resin. The movable table 42 can thus advance continuously without being stopped.

(7) Continuously Feeding Resin and Fibers

The movable table 42 continues to advance while curing of the resin 9 is accelerated. As shown in FIG. 13C, the resin 9, the fibers 5, and the sheet 191 are fed continuously. During feeding, the fibers 5 are tensioned as the movable table 42 moves and by a component such as the dancer roller 214, which serves as an opening unit. This reduces waviness or deformation of the fibers 5 when the fibers 5 are laminated.

After the curing acceleration of the resin 9 in the front end portion 3a, the transporter 15 may increase the transportation speed of the movable table 42. In this case, the resin 9 fed to a middle portion of the mold 3 does not cure to the degree to which the resin 9 is cured in the front end portion 3a, and the sheet 191 is removable from the laminate.

(8) Stopping Resin Feeding

When the rear end portion 3b of the mold 3 reaches the ejection nozzle 116 as shown in FIG. 14A, the resin feeder 11 stops feeding the resin 9 and raises the ejection nozzle 116. In this state, the movable table 42 continues to advance.

(9) Accelerating Curing in Rear End Portion and Stopping Movable Table

As shown in FIG. 14B, the transporter 15 decreases the transportation speed of the movable table 42 or stops the movable table 42 (decreases the transportation speed in this example) when the rear end portion 3b of the mold 3 approaches under the iron 131. This accelerates curing of the resin 9 fed to the rear end portion 3b. After the curing acceleration, as shown in FIG. 14C, the transporter 15 stops the movable table 42. This further accelerates curing of the resin 9 fed to the rear end portion 3b. The acceleration may be continued until the tensioned fibers 5 become unremovable from the resin 9 fed to the rear end portion 3b of the mold 3.

This allows the fibers 5 fed to a middle portion of the mold 3 between the front end portion 3a and the rear end portion 3b to remain tensioned, and reduces waviness or deformation of the fibers 5.

(10) Raising the Iron

When curing of the resin 9 in the rear end portion 3b of the mold 3 is accelerated, the iron 131 is raised, in parallel with or followed by the pressing device 17 raising the pressing roller 172 as shown in FIG. 14C.

(11) Cutting Fibers

After the pressing roller 172 is raised, the fibers 5 are cut as shown in FIG. 15A. After cut, the fibers 5 fed into the mold 3 have both ends fixed in the resin 9 for which curing has been accelerated, and remains tensioned.

The cut fibers 5 are fixed, together with the fixture 23, on a frame 25, which supports components including the ejection nozzle 116 and the roller 74.

(12) Removing Sheet

The sheet 191 fed to the fibers 5 is removed after curing of the resin 9 fed to the rear end portion 3b of the mold 3 is accelerated. The sheet 191 may be difficult to remove from the portions of the resin 9 in which curing of the resin is accelerated, which are the front end portion 3a and the rear end portion 3b of the mold 3. The cured portions, which form the front and rear end portions of the laminate, are to be cut off, and do not affect the resultant molded item.

(13) First Curing

The movable table 42 advances further. As shown in FIG. 15B, the resin 9 fed into the mold 3, or particularly the resin 9 fed to a middle portion of the mold 3, then undergoes first curing with acceleration.

(14) Moving the Mold to Standby Position

When the resultant laminate has a thickness equal to a target thickness of a molded item, the laminate is removed from the mold, and then undergoes second curing as appropriate.

When the resultant laminate has a thickness less than a target thickness, the movable table 42 retracts to the standby position as shown in FIG. 15C, and the processes (1) to (14) described above are repeated until the laminate will have the target thickness.

Modifications

The molding apparatus 1 according to the embodiment is not limiting. The embodiment may be modified as described below. The embodiment and at least one of the modifications may be combined or the modifications may be combined with one another. Examples that are not described in the embodiment or modifications or design changes without departing from the gist of the invention also fall within the scope of the present invention.

1. Accelerating Curing (1) Movable Table

Although curing of the resin is accelerated while the movable table 42 is being moved in the present embodiment, curing of the resin may be accelerated while, for example, the movable table 42 is being stopped.

(2) Unit for Acceleration

Although the single iron 131 serving as an example of a heating unit is used to accelerate curing of the resin in the embodiment, a plurality of heating units such as irons may be arranged in the direction in which the movable table moves when the laminate is think or when the efficiency of lamination (production efficiency) is to be enhanced.

The iron 131 as a heating unit in the above embodiment may be replaced by a heat gun that blows hot air or a heating furnace covering the laminate. When a plurality of heating units are used, these heating units may be of the same type or different types.

2. Feeding Fibers (1) Tension

Although not described in the embodiment, any level of tension may be applied to the fed fibers laminated in the lamination area. The level of tension may fall within the range of values greater than 0 mN/tex and less than 100 mN/tex, or in the range of values greater than 0 mN/tex and less than 50 mN/tex. The tension is a set (target) value during feeding of the fibers.

(2) Opening Fibers

Although the fibers are opened and fed in the embodiment, the fibers drawn from the rovings may be fed without being opened. The fibers opened and fed are more easily impregnated with a resin. Although the dancer roller 214 is used as an opening device in the embodiment, the opening device may be another unit, such as a nip roller, an opening roller (grooved roller), or an air jet. The opening roller (grooved roller) has grooves that can divide the width of fibers into three to five sections. The opening roller can open the fibers by simply applying tension against the fibers on the roller.

3. Curing Device

In the embodiment, the resin undergoes first curing after the feeding position of the resin reaches the rear end portion 3b of the mold 3 as the movable table moves. The curing device instead may be arranged at a position upstream from the position at which the resin feeding position reaches the rear end portion, and may allow the first curing or the curing to be complete by the time when the resin feeding position reaches the rear end portion. At least the curing accelerator accelerates curing in the rear end portion.

The curing device may be, for example, a tunnel furnace. For a photosetting resin, an irradiation device that emits light (e.g., an ultraviolet lamp, an infrared lamp, an LED, or a laser) may be used.

4. Mold

Although the single mold 3 is used in the embodiment, a plurality of molds may be used. Also, the curing device for curing resin may be arranged upstream from the rear end portion in a first direction that is the moving direction of the movable table, which may then move from the rear end portion to the front end portion along a path different from the movement path. This allows a component almost endless in the first direction to be obtained. For example, an endless belt conveyer having a plurality of molds arranged on its top surface may be used. The plurality of molds may be joined into a single mold on a linear portion of the belt conveyer.

In some embodiments, no mold may be used. The movable table may have its top surface including a lamination area, or a molded item may have an intended surface serving as a lamination area. For example, a long molded item may have its top surface including a recess across its length, into which a resin and fibers are fed.

5. Lamination Area

In the embodiment, a molded item (laminate) to be obtained is long in one direction. In other words, the laminate is rectangular, and is long in the direction in which the mold moves when viewed in a direction perpendicular to the movement direction of the mold (lateral direction when viewed in the movement direction).

In some embodiments, a molded item may have another shape.

Examples of the other shapes of molded items include curved shapes, such as ellipses, circles, elliptical arcs, or arcs, and polygons such as triangles when viewed in the direction perpendicular to the movement direction of the mold (lateral direction when viewed in the movement direction). To obtain molded items with such shapes, the mold may have the shape of an ellipse, a circle, or a polygon when viewed in the lateral direction, which is perpendicular to the movement direction of the mold.

Still other shape examples of molded items include curves such as ellipses, circles, elliptical arcs, or arcs, and polygons such as triangles when viewed in the direction perpendicular to the movement direction of the mold (vertical direction when viewed in the movement direction). To obtain molded items with such shapes, the mold may have the shape of an ellipse, a circle, or a polygon when viewed in the vertical direction, which is perpendicular to the movement direction of the mold, and the mold may then be rotated relatively about the axis of rotation in the vertical direction.

6. Impregnator

(1) Impregnation Method

The pressing device 17 is used as an example of the impregnator that impregnates the fibers 5 with the resin 9 in the embodiment. The impregnator may not be used, but the impregnator enhances the mechanical properties of the molded item.

Although the impregnation with the resin is performed using a pressure in the embodiment, the impregnation may be performed with another method. Examples include lowering the viscosity of the resin by, for example, heating. The curing accelerator for a curable resin may also serve as the impregnator.

The impregnation herein refers to entry (presence) of the resin between fibers (filaments). Although the amount of resin present between the fibers is not limited, the mechanical properties of a molded item are better when smaller and fewer voids form between the fibers (filaments).

(2) Pressing Device

The pressing roller 171 in the pressing device 17 is arranged upstream from the curing accelerator 13 in the embodiment. The pressing roller may be arranged upstream from the curing accelerator when the viscosity of the fed resin increases through accelerated curing without decreasing. When the viscosity of the fed resin first decreases temporarily and then increases, the pressing roller may be arranged downstream from the curing accelerator. Pressing devices may be arranged both upstream and downstream from the curing accelerator.

7. Sheet Collecting Device

Although the molding apparatus includes no sheet collecting device in the embodiment, the molding apparatus may include a sheet collecting device. For example, the sheet collecting device collects the sheet 191 removed from the resin 9 that is yet to be cured. The sheet collecting device collects the sheet 191 at a position downstream from at least the pressing roller. The sheet collecting device includes a collection roller for winding the sheet 191.

Others

1. Curing Acceleration

The iron 131 in the embodiment accelerates curing from the front end portion 32a to the rear end portion 32b of the lamination area 32. More specifically, the curing accelerator 13 accelerates curing of the resin 9 immediately after the resin 9 is fed. However, curing of the resin 9 may be accelerated in at least its portions fed to the front end portion 32a and the rear end portion 32b of the lamination area 32. For example, the iron 131 may be raised in a middle portion of the lamination area 32.

The molding apparatus according to this modification includes a fiber feeder that feeds fibers while the fibers are being tensioned, a resin feeder that feeds a resin, a transporter that relatively change a feeding position of the fibers and a feeding position of the resin from a first end of a lamination area to a second end of the lamination area, a first curing accelerator that accelerates curing of the resin fed to the first end, and a second curing accelerator that accelerates curing of the resin fed to the second end.

A manufacturing method used by this molding apparatus includes feeding of tensioned fibers and a resin to a first end of a lamination area, accelerating curing of the resin in the fed fibers and the fed resin, relatively changing a feeding position of the fibers and a feeding position of the resin from the first end of the lamination area to the second end of the lamination area while the fibers are being tensioned, and accelerating curing of the resin in the fibers and the resin fed to the second end.

The molding apparatus and the manufacturing method according to these modifications also accelerate curing of the resin fed to the second end while the fed fibers are being tensioned. The resultant fibers have less waviness or deformation.

The first curing accelerator and the second curing accelerator may be integrated in a single curing accelerator as in the embodiment.

Curing of the resin in the first end may be accelerated until the fibers fed to the first end become unremovable from the resin fed to the first end when the transporter has relatively changed or is currently relatively changing the feeding position.

Curing of the resin in the second end may be accelerated until the fibers fed to the second end become unremovable from the resin fed to the second end when the fibers being fed are cut or when the fed fibers are released from the applied tension.

When the lamination area is long, curing of the resin fed to the lamination area may be accelerated either in one operation or with a plurality of operations performed in a middle portion of the area in the longitudinal direction. In this case, the lamination area may be divided into a plurality of sections, each of which then serves as the lamination area described above. In other words, the second end of each section corresponds to the second end of the lamination area.

2. Tensioning Timing

The fibers of the molded item can have waviness or deformation during the molding process. In response to this, the resin in the two end portions of the lamination area may be cured while the fibers fed across the entire lamination area are being tensioned.

The fibers may be tensioned or may not be tensioned during acceleration of curing of the resin fed to the first end of the lamination area. However, the fibers fed to the lamination area are to be tensioned during acceleration of curing of the resin fed to the second end.

The molding apparatus according to this modification includes a fiber feeder that feeds fibers, a resin feeder that feeds a resin, a transporter that relatively changes a feeding position of the fibers and a feeding position of the resin from a first end of a lamination area to a second end of the lamination area, a first curing accelerator that accelerates curing of the resin fed to the first end, a tensioning device that tensions the fibers fed to the lamination area, and a second curing accelerator that accelerates curing of the resin fed to the second end while the fibers fed to the lamination area are being tensioned.

A manufacturing method used by this molding apparatus includes accelerating curing of a resin in fibers and a resin fed to a first end of a lamination area, then relatively changing a feeding position of the fibers and a feeding position of the resin from the first end to a second end of the lamination area, and accelerating curing of a resin in the fibers and the resin fed to the second end while the fed fibers are being tensioned.

The molding apparatus and the manufacturing method according to these modifications also accelerate curing of the resin fed to the second end after accelerating curing of the resin fed to the first end, while the fibers fed to the lamination area are being tensioned. The resultant fibers have less waviness or deformation.

The first curing accelerator and the second curing accelerator may be integrated in a single curing accelerator as in the embodiment.

Curing of the resin in the first end may be accelerated until the fibers fed to the first end become unremovable from the resin fed to the first end when the transporter has relatively changed or is currently relatively changing the feeding position.

Curing of the resin in the second end may be accelerated until the fibers fed to the second end become unremovable from the resin fed to the second end when the fibers being fed are cut or released from the applied tension.

When the lamination area is long, curing of the resin fed to the lamination area may be accelerated either in one operation or with a plurality of operations performed in a middle portion of the area in the longitudinal direction. In this case, the lamination area may be divided into a plurality of sections, each of which then serves as the lamination area described above. In other words, the second end of each section corresponds to the second end of the lamination area.

The fibers to be fed to an area between the first end and second end may be tensioned. For example, the tensioning device may tension the fibers fed after the curing acceleration of the resin in the first end. More specifically, the tension may be raised to a target value when the curing acceleration in the first end is complete. This allow easier constraining of the fibers during curing acceleration in the second end.

3. Curing Acceleration of First End

In the embodiment, the fixture 23 fixes the fibers 5 to the front end portion 42a of the movable table 42 before the fibers 5 are fed to the front end portion 32a, which is a first end of the lamination area 32. When the lamination area is moved relatively, or when the fibers fed across the entire lamination area are tensioned, the fibers may be unremovably fixed by the fixture. In this case, the resin fed to the first end portion of the lamination area may complete the curing acceleration before the curing acceleration of the resin fed to the second end is complete.

The molding apparatus according to this modification includes a fiber feeder that feeds fibers across the entire lamination area, a fixture that fixes the fibers fed to a first end of the lamination area, a resin feeder that feeds a resin across the entire lamination area, a tensioning device that tensions the fibers fed across the entire lamination area, a first curing accelerator that accelerates curing of the resin fed to the first end of the lamination area, and a second curing accelerator that accelerates curing of the resin fed to a second end of the lamination area. The first curing accelerator stops curing acceleration of the resin in the first end before the curing acceleration of the resin in the second end of the lamination area is complete.

The molding apparatus according to this modification also accelerates curing of the resin fed to the first and second ends while the fed fibers are being tensioned. The resultant fibers have less waviness or deformation.

The fibers and the resin can be fed across the entire lamination area by the transporter relatively changing a feeding position of the fibers and a feeding position of the resin from a first end of the lamination area to a second end of the lamination area.

REFERENCE SIGNS LIST

1 molding apparatus
3 mold 4 mold support device
5 fibers
7 fiber feeder
9 resin
11 resin feeder
13 curing accelerator
15 transporter
17 pressing device
32 lamination apparatus
32a first end
32b second end

The invention claimed is:

1. A molding apparatus for molding a fiber reinforced resin material, the apparatus comprising:
   a fiber feeder configured to feed fibers to a lamination area of a mold or molded item mounted on a support table;
   a resin feeder configured to feed a resin to the lamination area;
   a curing accelerator configured to accelerate, on the support table, curing of the resin to which the fibers have been fed, while the fed fibers are being tensioned;
   a pressing device configured to impregnate, on the support table, the fed fibers with the resin to which the fibers have been fed;
   wherein the pressing device comprises a pressing roller and a separate actuator;
   and
   a transporter configured to change a feeding position of the fibers, a feeding position of the resin, a curing accelerator position, and a position of the impregnating, by relatively moving the support table.

2. The molding apparatus for molding a fiber reinforced resin material according to claim 1, wherein
   the fiber feeder feeds the fibers while the fibers are being tensioned, and
   the curing accelerator accelerates curing of the fed resin until the fibers become unremovable from the fed resin.

3. The molding apparatus for molding a fiber reinforced resin material according to claim 2, wherein
   the fiber feeder feeds the fibers to an area in which the resin is fed.

4. The molding apparatus for molding a fiber reinforced resin material according to claim 1, wherein:
   the pressing roller is configured to be movable in a direction in which the pressure is applied.

5. The molding apparatus for molding a fiber reinforced resin material according to claim 1, wherein
   the transporter relatively moves the support table after the fed fibers have been fixed on the support table side.

6. The molding apparatus of claim 1, wherein the pressing roller is separate from the fiber feeder, the resin feeder, and the curing accelerator.

7. The molding apparatus of claim 1, wherein the fiber feeder includes a roller configured to be movable toward and away from the mold or molded item, the roller of the pressing device is separate from the roller of the fiber feeder, and the actuator of the pressing device presses only the roller of the pressing device.

8. The molding apparatus of claim 1, wherein the fiber feeder comprises a first roller and a first actuator to move only the first roller toward and away from the mold or molded item, the actuator presses only the roller of the pressing device, and the first roller and first actuator being separate from the pressing roller and the actuator.

9. The molding apparatus of claim 8, wherein the fiber feeder includes a support rack configured to support a roving, and a guide roller configured to guide the fibers drawn from the roving to the roller of the fiber feeder, and the transporter moves the support table without moving the fiber feeder.

10. A manufacturing method, comprising:
    feeding fibers to a lamination area of a mold or molded item mounted on a support table;
    feeding a resin to the lamination area;
    accelerating, on the support table, curing of the fed resin the resin to which the fibers have been fed, while the fed fibers are being tensioned;
    applying pressure to the fed fibers with the resin to which the fibers have been fed on the support table using a pressing roller and a separate actuator
    and
    changing a feeding position of the fibers, a feeding position of the resin, a curing accelerator position, and a position of applying pressure, by relatively moving the support table.

11. The manufacturing method of claim 10, wherein
    in the step of applying pressure, pressure is applied by a pressing roller to the fibers and the resin that are fed to the lamination area that is movable in the direction in which the pressure is applied.

12. The manufacturing method of claim 10, wherein in the position changing, the support table is relatively moved, after the fed fibers have been fixed on the support table side.

13. The method of claim 10, wherein the pressing roller is separate from a fiber feeder for feeding fibers to the lamination area, a resin feeder for feeding the resin to the lamination area, and a curing accelerator for accelerating curing of the fed resin .

14. The method of claim 10, wherein the step of feeding fibers includes a roller configured to be movable toward and away from the mold or molded item, the roller being separate from the pressing roller.

15. The method of claim 10, wherein the step of feeding fibers includes a first roller and a first actuator to move only the first roller toward and away from the mold or molded item, and wherein the actuator presses only the pressing roller, and the first roller and first actuator are separate from the pressing roller and the actuator.

16. The molding apparatus of claim 15, further comprising the steps of drawing fibers via a roving and guiding the fibers drawn from the roving to the first roller.

* * * * *